United States Patent
Nash

(10) Patent No.: US 12,011,947 B2
(45) Date of Patent: Jun. 18, 2024

(54) DISPENSING STRUCTURE AND DISPENSING ASSEMBLY

(71) Applicant: 3M INNOVATIVE PROPERTIES COMPANY, St. Paul, MN (US)

(72) Inventor: James E. Nash, Bloomington, MN (US)

(73) Assignee: 3M Innovative Properties Company, St. Paul, MN (US)

(*) Notice: Subject to any disclaimer, the term of this patent is extended or adjusted under 35 U.S.C. 154(b) by 104 days.

(21) Appl. No.: 17/797,029

(22) PCT Filed: Feb. 8, 2021

(86) PCT No.: PCT/IB2021/051009
§ 371 (c)(1),
(2) Date: Aug. 2, 2022

(87) PCT Pub. No.: WO2021/161150
PCT Pub. Date: Aug. 19, 2021

(65) Prior Publication Data
US 2023/0068830 A1    Mar. 2, 2023

Related U.S. Application Data

(60) Provisional application No. 62/972,222, filed on Feb. 10, 2020.

(51) Int. Cl.
*B42D 5/00*    (2006.01)
*B65D 83/08*    (2006.01)
(Continued)

(52) U.S. Cl.
CPC ............. *B42D 5/006* (2013.01); *B42D 5/005* (2013.01); *B65D 83/08* (2013.01); *B65H 3/32* (2013.01); *F16B 2/10* (2013.01)

(58) Field of Classification Search
CPC ......... B42D 5/005; B42D 5/006; B65D 83/08
(Continued)

(56) References Cited

U.S. PATENT DOCUMENTS

| 2,114,477 | A | * | 4/1938 | Ritchie | ................. | B42D 5/005 |
|           |   |   |        |         |                   | 24/67.3 |
| 2,226,454 | A | * | 12/1940 | Walters | ................. | B42D 5/006 |
|           |   |   |         |         |                   | 24/67.1 |

(Continued)

FOREIGN PATENT DOCUMENTS

| CN | 101489802 | A | * | 7/2009 | ......... | B42D 15/0093 |
| GB | 2477305 | A | * | 8/2011 | ............. | B42D 5/006 |

(Continued)

OTHER PUBLICATIONS

International Search Report for PCT International Application No. PCT/IB2021/051009, mailed on May 18, 2021, 5 pages.

*Primary Examiner* — Kyle R Grabowski
(74) *Attorney, Agent, or Firm* — Bryan Walker

(57) ABSTRACT

A dispensing structure (102) for dispensing sheets, such as notes (106) or flags, that is adapted to be removably coupled with a support structure. A dispensing assembly comprising a stack (104) of sheets, such as notes or flags, and the dispensing structure. The dispensing structure comprises: a first clamping member (118) defining a first end (120) and a second end (122); a second clamping member (146) pivotally coupled to the first clamping member, the second clamping member defining a third end (148) and a fourth end (150), the second clamping member comprising: a base plate (152) defining an aperture (154); a retention element (182) laterally spaced apart from the base plate to define a space (184) therebetween, wherein a stack of a plurality of sheets are disposed within the space; and a plunger (200) slidable within the aperture of the base plate; and a biasing member (218) connected to the first clamping member proximate the (Continued)

first end thereof and to the second clamping member proximate the third end thereof, wherein the biasing member is adapted to bias the second end and the fourth end of the first and second clamping members, respectively, towards the support structure for coupling the dispensing structure with the support structure. The retention element (182) includes a first plate (186) and a second plate (188) longitudinally spaced apart from the first plate such that a slot (190) is defined therebetween, and wherein at least one of the sheets of the stack is adapted to pass through the slot.

20 Claims, 4 Drawing Sheets

(51) Int. Cl.
*B65H 3/32* (2006.01)
*F16B 2/10* (2006.01)

(58) Field of Classification Search
USPC .................................. 281/44, 45; 221/48, 52
See application file for complete search history.

(56) References Cited

U.S. PATENT DOCUMENTS

| | | | | |
|---|---|---|---|---|
| 2004/0256405 | A1* | 12/2004 | Thompson | B65D 83/0805 |
| | | | | 221/63 |
| 2006/0091028 | A1* | 5/2006 | Bastiaens | B42D 5/006 |
| | | | | 206/307.1 |
| 2013/0276282 | A1* | 10/2013 | Brown | F16M 13/022 |
| | | | | 248/200 |

FOREIGN PATENT DOCUMENTS

| | | | |
|---|---|---|---|
| JP | 2009544536 A | * 12/2009 | |
| WO | WO-2014077529 A1 | * 5/2014 | ............ B42D 5/006 |

* cited by examiner

DISPENSING STRUCTURE AND DISPENSING ASSEMBLY

CROSS REFERENCE TO RELATED APPLICATIONS

This application is a national stage filing under 35 U.S.C. 371 of PCT/IB2021/051009, filed 8 Feb. 2021, which claims the benefit of U.S. Provisional Application No. 62/972,222, filed 10 Feb. 2020, the disclosures of which are incorporated by reference in their entireties herein.

TECHNICAL FIELD

The present disclosure relates to a dispensing structure and a dispensing assembly for dispensing sheets, particularly at least one of notes or flags.

BACKGROUND

Dispensers, such as single pop-up dispensers for notes or flags, typically include a spring to facilitate dispensing of a single note or flag. In order to mechanically mount such dispensers to a structure, such as a desk, shelf, wall, or the like two springs have been used: one spring for mounting the dispenser to the structure and a second spring to facilitate dispensing of the note or flag.

SUMMARY

Generally, the present disclosure relates to a dispensing structure and a dispensing assembly. The disclosure recognizes a need for dispensing assemblies that are compact in size, light in weight, and cost effective. Accordingly, the dispensing structure described herein includes a single biasing member. A biasing force applied by the single biasing member may be used to couple the dispenser structure to a support structure as well as allow single dispensing of a single sheet at a time from a stack of sheets. The sheets in the stack can particularly be notes. The sheets in the stack can particularly be flags.

In one aspect, there is provided a dispensing structure adapted to be removably coupled with a support structure. The dispensing structure includes a first clamping member defining a first end and a second end. The dispensing structure also includes a second clamping member pivotally coupled to the first clamping member, the second clamping member defining a third end and a fourth end. The second clamping member includes a base plate defining an aperture. The second clamping member also includes a retention element laterally spaced apart from the base plate to define a space therebetween, wherein a stack of a plurality of sheets, particularly at least one of notes and flags, is disposed within the space. The second clamping member further includes a plunger slidable within the aperture of the base plate. The dispensing structure further includes a biasing member connected to the first clamping member proximate the first end thereof and to the second clamping member proximate the third end thereof, wherein the biasing member is adapted to bias the second end and the fourth end of the first and second clamping members, respectively, towards the support structure for coupling the dispensing structure with the support structure.

In another aspect, there is provided a dispensing assembly. The dispensing assembly includes a dispensing structure adapted to be removably coupled with a support structure. The dispensing structure includes a first clamping member defining a first end and a second end. The dispensing structure also includes a second clamping member pivotally coupled to the first clamping member, the second clamping member defining a third end and a fourth end. The second clamping member includes a base plate defining an aperture. The second clamping member also includes a retention element laterally spaced apart from the base plate to define a space therebetween. The second clamping member further includes a plunger slidable within the aperture of the base plate. The dispensing structure includes a biasing member connected to the first clamping member proximate the first end thereof and to the second clamping member proximate the third end thereof, wherein the biasing member is adapted to bias the second end and the fourth end of the first and second clamping members, respectively, towards the support structure for coupling the dispensing structure with the support structure. The dispensing assembly includes a stack of a plurality sheets, particularly at least one of notes and flags, removably adhered to each other, wherein the stack is disposed within the space defined between the retention element and the base plate.

BRIEF DESCRIPTION OF THE DRAWINGS

Exemplary embodiments disclosed herein may be more completely understood in consideration of the following detailed description in connection with the following figures. The figures are not necessarily drawn to scale. Like numerals used in the figures refer to like components.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the context of present disclosure, the terms "first", "second", "third", and "fourth" are used as identifiers. Therefore, such terms should not be construed as limiting of this disclosure. The terms "first", "second", "third", and "fourth" when used in conjunction with a feature or an element can be interchanged throughout the embodiments of this disclosure.

The present disclosure relates to a dispensing structure and a dispensing assembly for dispensing sheets one at a time from a stack of sheets. The stack of sheets is particularly a stack of notes or flags, in which case the sheets are notes or flags. More particularly, the stack of sheets is a stack of notes, in which case the sheets are notes. The dispensing structure includes a first clamping member and a second clamping member that allow coupling of the dispensing structure with a number of support structures having horizontal surfaces and/or vertical surfaces, thereby improving usability. Further, the dispensing structure includes a single biasing member that serves dual purpose of single dispensing of notes or flags and gripping of the dispensing structure to various support structures. Because it requires only one spring that serves both to dispense the sheets and clamp the dispensing structure and dispensing assembly to a surface, the dispensing structure and dispensing assembly is compact in size, light weight, and cost effective.

Figure 1:
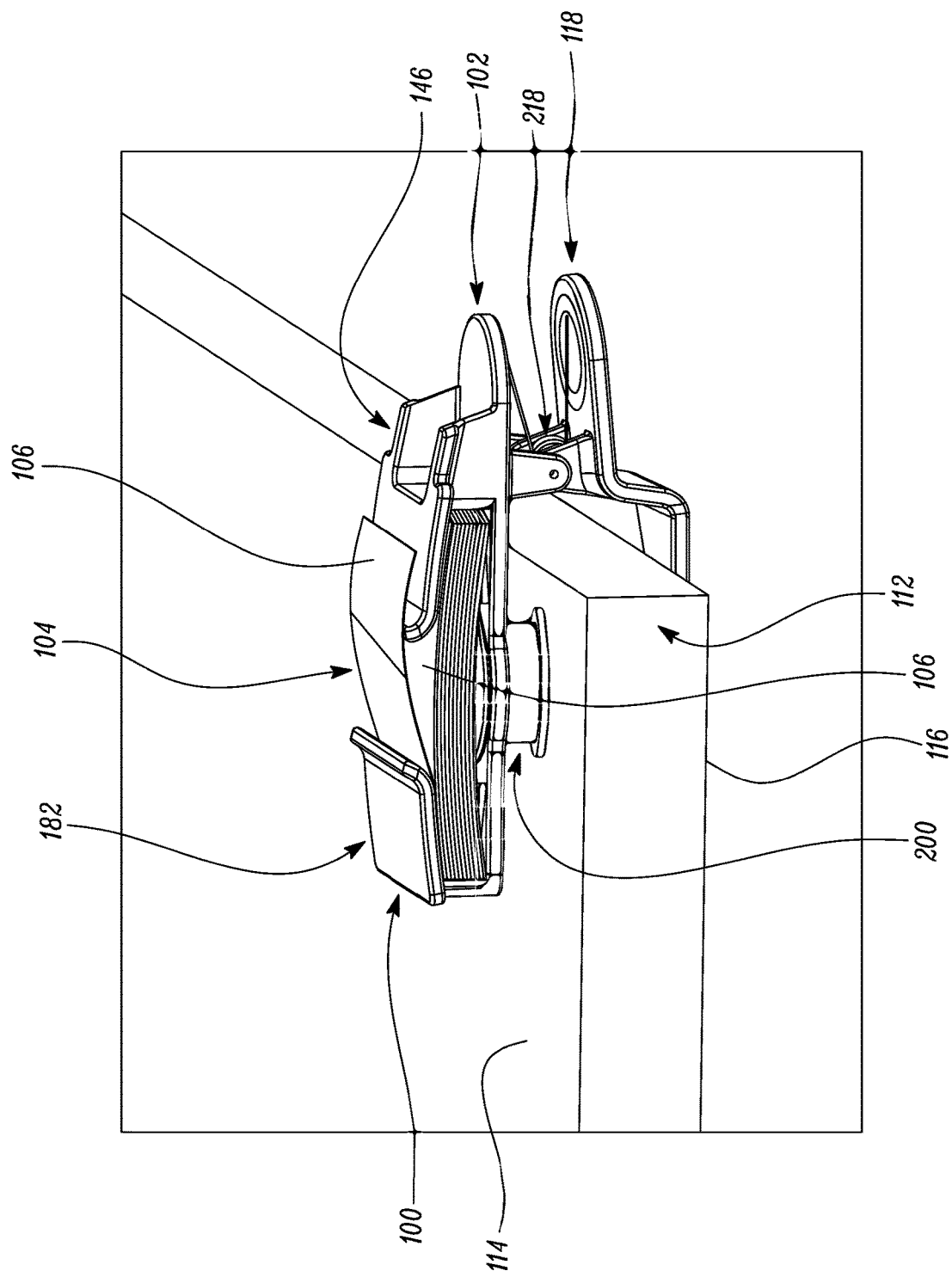
FIG. 1 is a perspective view of a dispensing assembly including a dispensing structure and a stack of notes disposed within the dispensing structure according to an embodiment of the present disclosure.

FIG. 1 is a perspective view of a dispensing assembly 100. The dispensing assembly 100 includes a dispensing structure 102 and a stack 104 of a plurality of at least one type of sheets, which are notes 106 in this FIG. 1, removably adhered to each other. The dispensing structure 102 is adapted to be removably coupled with a support structure 112. The support structure 112 may be a desk, a partition/privacy panel, a cubicle wall, a shelf, or the like. The support structure 112 may include a vertical structure or a horizontal structure. The support structure 112 defines a first side 114 and a second side 116 disposed opposite to the first side 114. Further, in the illustrated example, the stack 104 is a pad having a plurality of notes 106. The stack 104 may include multiple similarly shaped and sized notes 106 that are stacked one above the other, but it is also possible that the sheets (in this case notes) have different sizes or shapes. Further, an adhesive (not shown) can be applied to one or more vertical sides, particularly one vertical side, of the stack 104 to reversibly bind the notes 106 securely together along one or more of their perimeter edges, particularly one perimeter edge. In another example, the notes 106 may be assembled in a z-stack such that the adhesive of each sheet, such as note 106, is positioned at alternating ends of the stack 104 of the sheets (here notes 106).

Figure 2:
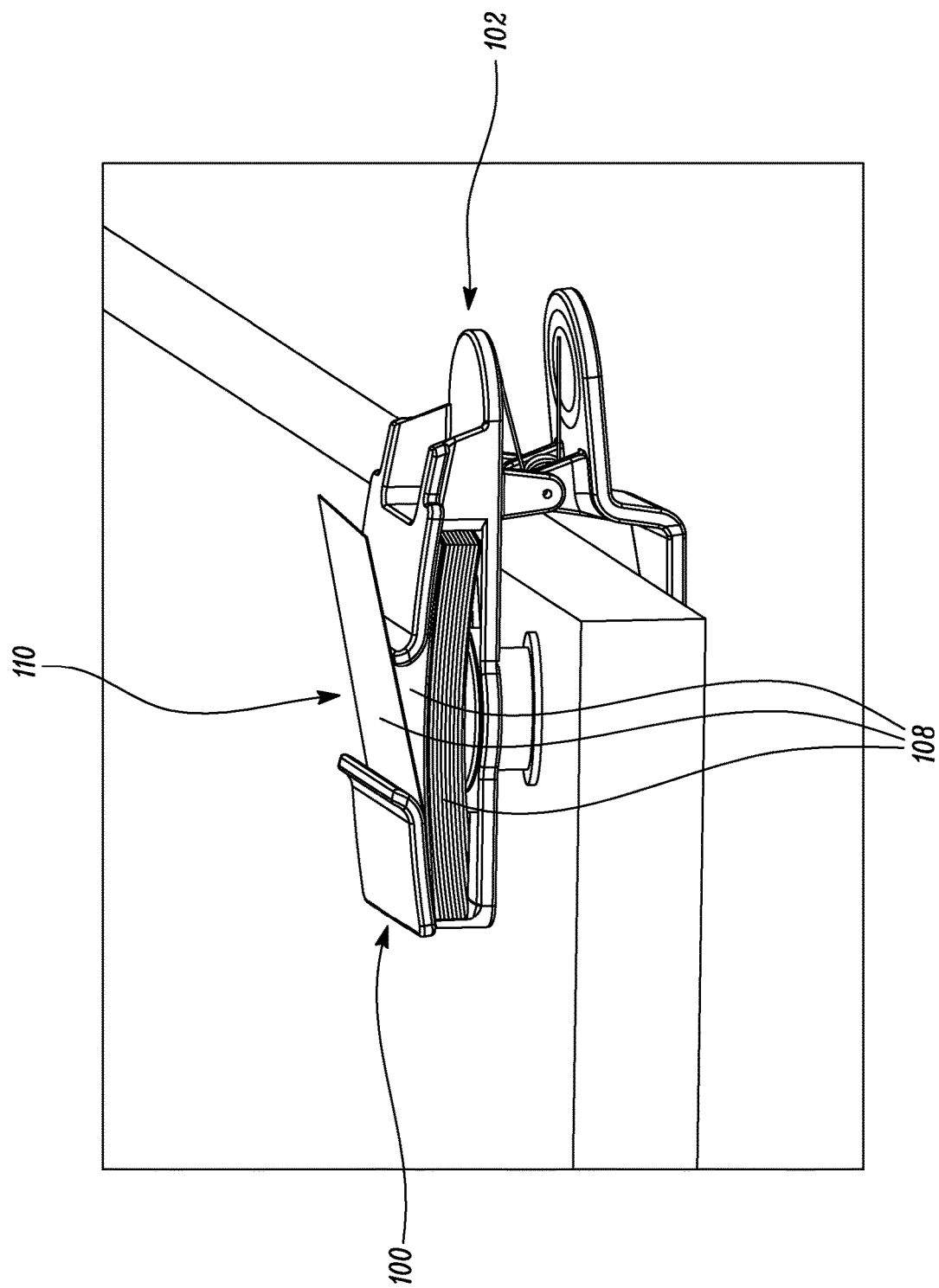
FIG. 2 is a perspective view of the dispensing structure of FIG. 1 and a stack of flags disposed in the dispensing structure according to an embodiment of the present disclosure.

Referring to FIG. 2, the dispensing assembly 100 may be used to hold flags 108. More particularly, the dispensing assembly 100 is used to hold a stack 110. The stack 110 is a pad having a plurality at least one type of sheets, which in this FIG. 2 are flags 108. The stack 110 is received within the dispensing structure 102.

The dispensing structure 102 will now be explained in more detail with reference to the example that is configured for holding the stack 104 of the notes 106. However, it should be understood that the description provided below is equally applicable for other dispensing structures holding stacks of other types of sheets, particularly the stack 110 of the flags 108.

Figure 3:
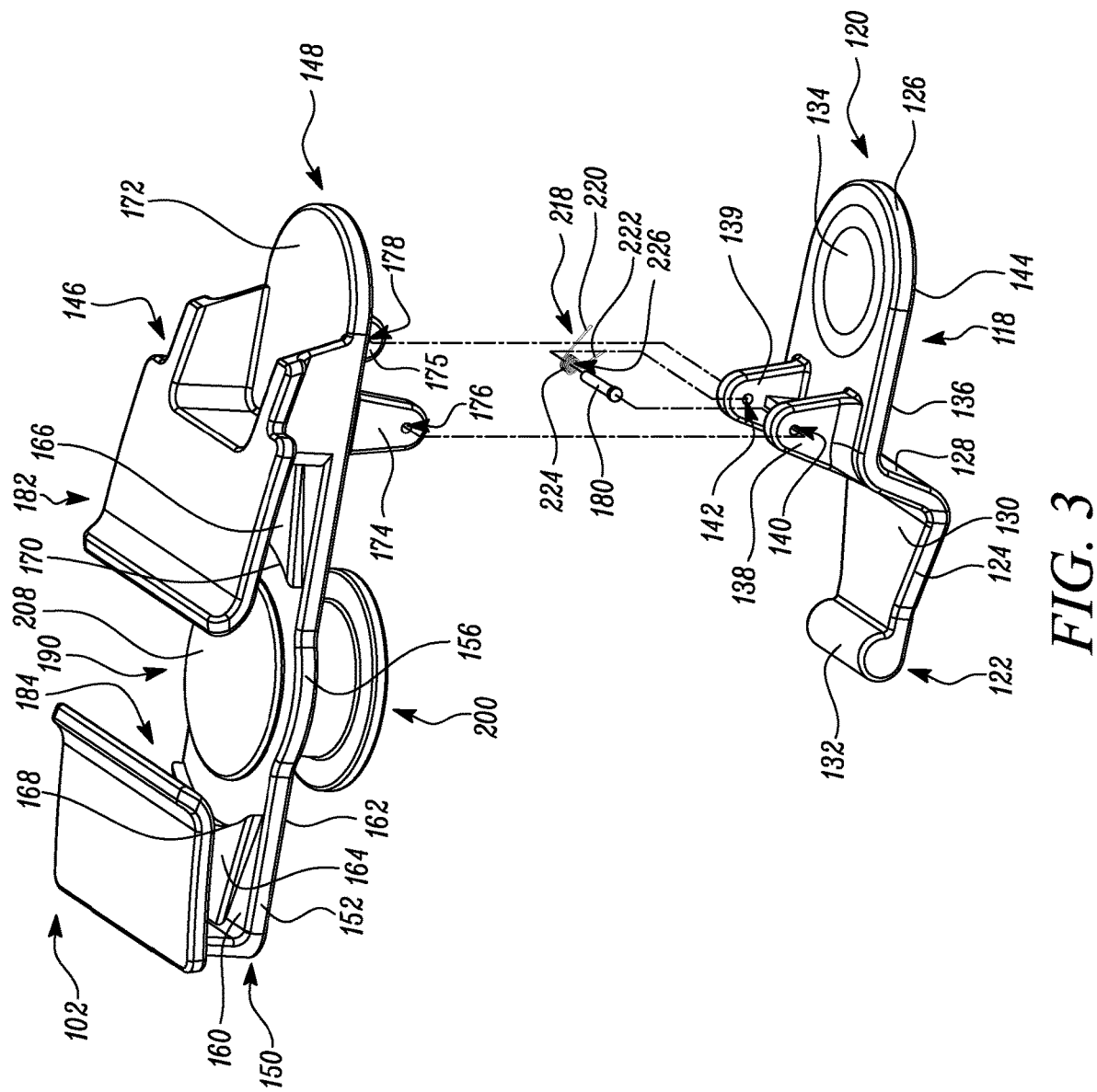
FIG. 3 is an exploded view of the dispensing structure of FIG. 1.

As shown in FIG. 3, the dispensing structure 102 includes a first clamping member 118 defining a first end 120 and a second end 122. The first clamping member 118 defines a generally Z-shaped structure having a first portion 124, a second portion 126, and a third portion 128 extending between the first and second portions 124, 126. The first portion 124 defines a first surface 130. Further, the first clamping member 118 is adapted to contact the second side 116 (see FIGS. 1 and 4) of the support structure 112 (see FIGS. 1 and 4) for coupling the dispensing structure 102 with the support structure 112. More particularly, a contact portion 132 of the first portion 124 that extends from the first surface 130 of the first portion 124 contacts or engages the second side 116 of the support structure 112. The contact portion 132 is disposed proximate the second end 122 of the first clamping member 118. In this Figure the contact portion 132 is semi-cylindrical, but other shapes are possible, and it is also possible for the contact portion to be flat. In some examples, a flexible material, such as felt, may be disposed on the contact portion 132 that contacts the second side 116 of the support structure 112.

The second portion 126 defines a second surface 134 and a third surface 136 disposed opposite to the second surface 134. While both the second surface 134 and third surface 136 are depicted here as being generally flat and having a particular shape, they do not have to be flat and other shapes are also possible. The first clamping member 118 also includes a pair of first brackets 138, 139. The pair of first brackets 138, 139 extend from the second portion 126 of the first clamping member 118. More particularly, the pair of first brackets 138, 139 extend from the second surface 134 of the second portion 126. The first bracket 138 defines a first through-hole 140 and the first bracket 139 defines a second through-hole 142 that is in alignment with the first through-hole 140.

Further, the first clamping member 118 defines a first gripping surface 144 proximate the first end 120 thereof. The first gripping surface 144 is defined at the second portion 126 of the first clamping member 118. More particularly, the first gripping surface 144 is defined on the third surface 136 of the second portion 126. In some examples, the first gripping surface 144 may include a depression provided in the third surface 136 to allow a user to hold or grip the dispensing structure 102. The depression may be any shape, such as circular, oval, rectangular, or square in shape, without any limitations. Similarly, while the first gripping surface 144 is depicted as having a particular shape, other shapes are also possible.

The dispensing structure 102 further includes a second clamping member 146 pivotally coupled to the first clamping member 118. The second clamping member 146 defines a third end 148 and a fourth end 150. The second clamping member 146 includes a base plate 152 defining an aperture 154 (shown in FIG. 4). The aperture 154 is embodied here as a circular through-aperture, but other shapes are possible depending on the shape of the sheets, such as notes or flags, to be used. The aperture 154 is disposed proximate the fourth end 150 of the second clamping member 146. Moreover, the base plate 152 defines a first arc portion 156 and a second arc portion (not shown) disposed opposite to the first arc portion 156. The base plate 152 also defines a fourth surface 160 and a fifth surface 162 disposed opposite to the fourth surface 160. Further, the base plate 152 includes a first projecting portion 164 and a second projecting portion 166. The first and second projecting portions 164, 166 extend from the fourth surface 160 of the base plate 152. The first projecting portion 164 defines a first curvature 168 and the second projecting portion 166 defines a second curvature 170. Further, a receiving space 212 (shown in FIG. 4) is defined between the first and second curvatures 168, 170.

The second clamping member 146 defines a second gripping surface 172 proximate the third end 148 thereof. More particularly, the second gripping surface 172 is defined on the fourth surface 160 of the base plate 152. In some examples, the second gripping surface 172 may include a depression provided in the fourth surface 160 to allow the user to hold or grip the dispensing structure 102. The shape of the second gripping surface 172 may be altered from what is shown here depending on the needs of the user. The depression may be any suitable shape, such as circular, oval, rectangular, or square in shape, without any limitations. Further, the dispensing structure 102 is adapted to be at least one of coupled and removed from the support structure 112 based on a pressure applied at the first and second gripping surfaces 144, 172. The pressure is applied by the user. The second clamping member 146 also includes a pair of second brackets 174, 175. The pair of second brackets 174, 175 extend from the fifth surface 162 of the base plate 152. The second bracket 174 defines a third through-hole 176 and the second bracket 175 defines a fourth through-hole 178 that is in alignment with the third through-hole 176. When the dispensing structure 102 is assembled, the first, third, second, and fourth through-holes 140, 176, 142, 178 are aligned to receive a pin 180 therethrough. The pin 180 allows the first and second clamping members 118, 146 to pivot for coupling and removal of the dispensing structure 102.

Figure 4:
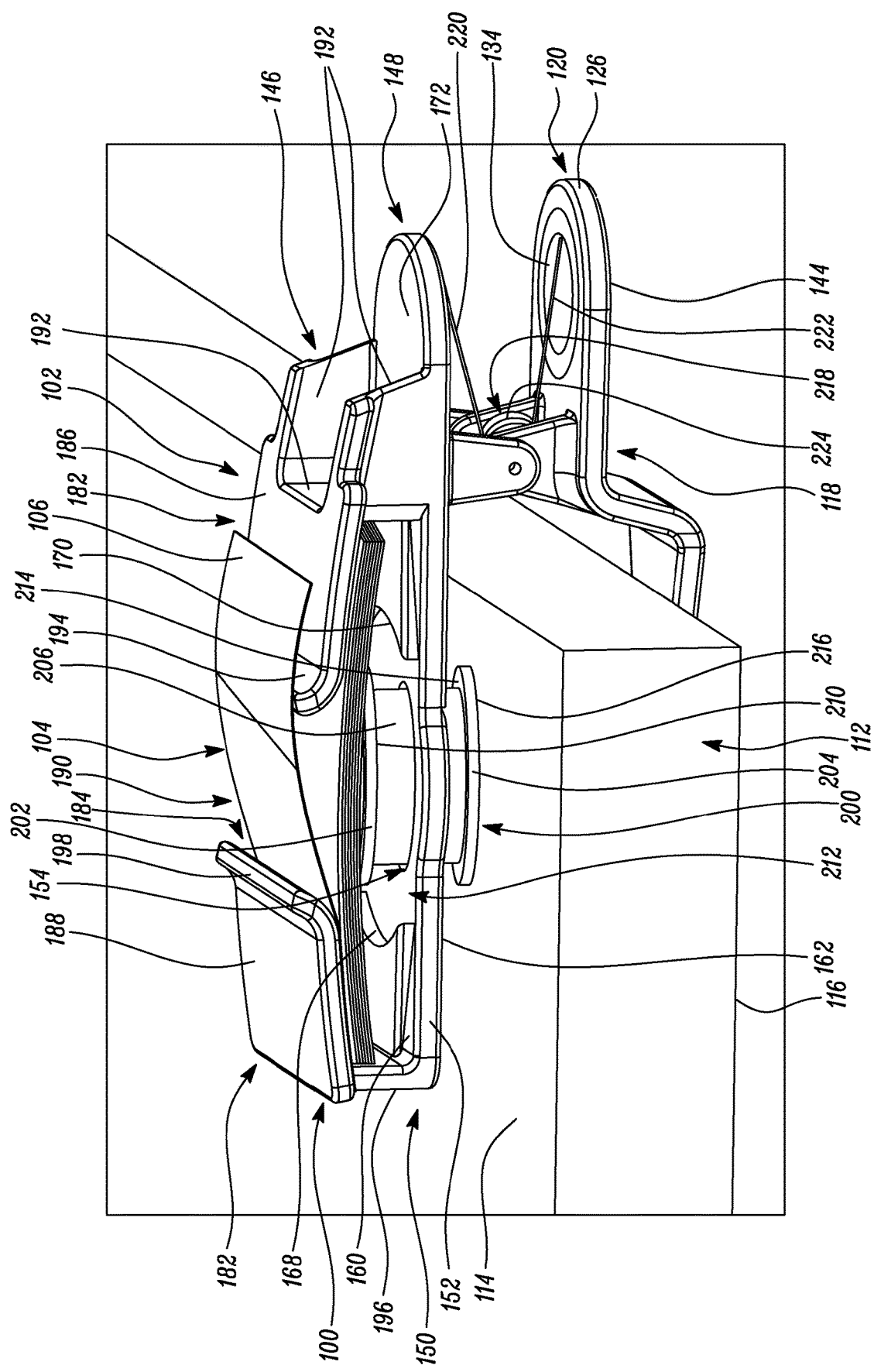
FIG. 4 is a perspective view of the dispensing assembly of FIG. 1 wherein multiple notes are removed from the stack.

As shown in FIG. 4, the second clamping member 146 includes a retention element 182 laterally spaced apart from the base plate 152 to define a space 184 therebetween. The stack 104 is disposed within the space 184 defined between the retention element 182 and the base plate 152. The space 184 varies based on removal of the stack 104 or removal of the notes 106 from the stack 104. In the illustrated embodiment, the retention element 182 includes a first plate 186 and a second plate 188 longitudinally spaced apart from the first plate 186 such that a slot 190 is defined therebetween. At least one of the notes 106 and the flags 108 (see FIG. 2) of the stack 104 is adapted to pass through the slot 190. Further, the first plate 186 is connected to the base plate 152 proximate the third end 148 of the second clamping member 146 by a number of vertical members 192. The first plate 186 defines a first curved portion 194. Moreover, the second plate 188 is connected to the base plate 152 proximate the fourth end 150 of the second clamping member 146 by a vertical member 196. The second plate 188 defines a second curved portion 198. In another example, the retention element 182 may include a single plate element. For example, the retention element 182 may include a rectangular plate that defines a slot therein to allow passage of the notes 106 or the flags 108 therethrough. In other embodiments retention element 182 may have other shapes, such as being forked or pronged.

The second clamping member 146 further includes a plunger 200 slidable within the aperture 154 of the base plate 152. The plunger 200 is adapted to contact the first side 114 of the support structure 112. The plunger 200 includes an upper member 202, a lower member 204, and an intermediate member 206 extending between the upper member 202 and the lower member 204. The upper member 202 and the lower member 204 are shown to be disc shaped. Alternatively, the upper member 202 and the lower member 204 may have a different shape, for example, the upper member 202 and the lower member 204 may be square, rectangular, or elliptical in shape. Further, the intermediate member 206 is shown to be cylindrical in shape. Alternatively, the intermediate member 206 may include a different cross-section, for example, the intermediate member 206 may have a square, rectangular, or elliptical cross-section. It should be noted that the cross-section of the intermediate member 206 is same as a shape defined by the aperture 154. Accordingly, the cross-section of the intermediate member 206 may vary based on the shape defined by the aperture 154, and vice versa.

Further, the upper member 202 defines a first upper surface 208 (shown in FIG. 3) and a first lower surface 210. The upper member 202 is adapted to contact the stack 104 when the stack 104 is disposed within the space 184. More particularly, the first upper surface 208 of the upper member 202 contacts the stack 104. Further, when one full stack 104 of the notes 106 is received within the space 184, a portion of the upper member 202 may be received between the receiving space 212 defined between the first and second curvatures 168, 170. Moreover, the first lower surface 210 may contact the fourth surface 160 of the base plate 152. When the stack 104 is removed from the space 184 or when the notes 106 are removed from the stack 104, the first lower surface 210 is spaced apart from the fourth surface 160 of the base plate 152.

The lower member 204 defines a second upper surface 214 and a second lower surface 216. In an absence of the stack 104 within the space 184, the second upper surface 214 may contact the fifth surface 162 of the base plate 152. Further, when the stack 104 is received within the space 184, the second upper surface 214 is spaced apart from the fifth surface 162 of the base plate 152. Moreover, the second lower surface 216 of the lower member 204 contacts or engages the first side 114 of the support structure 112 when the dispensing structure 102 is coupled with the support structure 112. In some examples, a flexible material, such as felt, may be disposed on the second lower surface 216 that contacts the first side 114 of the support structure 112.

Further, the dispensing structure 102 includes a biasing member 218 connected to the first clamping member 118 proximate the first end 120 thereof and to the second clamping member 146 proximate the third end 148 thereof. The biasing member 218 is a spring. In the illustrated example, the biasing member 218 is a torsion spring. The biasing member 218 includes a first arm 220, a second arm 222, and a winding portion 224 extending between the first and second arms 220, 222. The winding portion 224 is disposed such that the pin 180 (see FIG. 3) passes through a hollow portion 226 (shown in FIG. 3) defined by the winding portion 224. The first arm 220 is fixedly coupled with the base plate 152 at the fifth surface 162 thereof. An adhesive may be used to couple the first arm 220 with the base plate 152. Further, the second arm 222 is fixedly coupled with the second portion 126 of the first clamping member 118. More particularly, the second arm 222 is fixedly coupled with the second portion 126 at the second surface 134 thereof. In some examples, an adhesive may be used to couple the second arm 222 with the second portion 126.

The biasing member 218 is adapted to bias the second end 122 (see FIG. 3) and the fourth end 150 of the first and second clamping members 118, 146, respectively, towards the support structure 112 for coupling the dispensing structure 102 with the support structure 112. Thus, when the dispensing structure 102 is coupled with the support structure 112, a biasing force applied by the biasing member 218 ensures coupling of the dispensing structure 102 with the support structure 112. Further, when the dispensing structure 102 is to be removed from the support structure 112, the pressure applied by the user at the first and second gripping surfaces 144, 172 acts against the biasing force of the biasing member 218 thereby allowing removal of the dispensing structure 102 form the support structure 112.

Moreover, when the dispensing structure 102 is coupled with the support structure 112 and the stack 104 is removed from the dispensing structure 102, the biasing force applied by the biasing member 218 is adapted to bias the base plate 152 towards the lower member 204. However, when the stack 104 is disposed within the space 184, the base plate 152 moves towards the upper member 202 against the biasing force applied by the biasing member 218. Further, as illustrated in the accompanying figure, the biasing member 218 is adapted to bias the base plate 152 towards the lower member 204 based on removal of at least one of the notes 106 and the flags 108 (see FIG. 2) from the stack 104. More particularly, when a note 106 or a flag 108 is removed from the stack 104, the base plate 152 moves towards the lower member 204 due to the biasing force applied by the biasing member 218. Simultaneously, the retention element 182 moves towards the plunger 200 causing a single sheet, such as a single note 106 or a single flag 108 to advance against the slot 190 thereby allowing dispensing of a single sheet, such as a single note 106 or a single flag 108 at a time and preventing double dispensing. Thus, the biasing member 218 allows coupling of the dispensing assembly 100 with the support structure 112 as well as dispensing of a single note 106 or flag 108. Further, usage of the single biasing member 218 allows reduction in weight and cost of the dispensing assembly 100.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A dispensing structure adapted to be removably coupled with a support structure, the dispensing structure comprising:
    a first clamping member defining a first end and a second end, the first clamping member is adapted to contact a second side of the support structure for coupling the dispensing structure with the support structure;
    a second clamping member pivotally coupled to the first clamping member, the second clamping member defining a third end and a fourth end, the second clamping member comprising:
        a base plate defining an aperture;
        a retention element laterally spaced apart from the base plate to define a space therebetween, wherein a stack of a plurality of sheets are disposed within the space; and
        a plunger slidable within the aperture of the base plate, wherein the plunger is adapted to contact a first side of the support structure; and
    a biasing member connected to the first clamping member proximate the first end thereof and to the second clamping member proximate the third end thereof,
    wherein the biasing member is adapted to bias the second end and the fourth end of the first and second clamping members, respectively, towards the support structure for coupling the dispensing structure with the support structure.

2. The dispensing structure of claim 1, wherein the retention element includes a first plate and a second plate longitudinally spaced apart from the first plate such that a slot is defined therebetween, and wherein at least one of the sheets of the stack is adapted to pass through the slot.

3. The dispensing structure of claim 1, wherein the first clamping member defines a first gripping surface proximate the first end thereof and the second clamping member defines a second gripping surface proximate the third end thereof.

4. The dispensing structure of claim 1, wherein the dispensing structure is adapted to be at least one of coupled and removed from the support structure based on a pressure applied at the first and second gripping surfaces.

5. A dispensing structure adapted to be removably coupled with a support structure, the dispensing structure comprising:
    a first clamping member defining a first end and a second end;
    a second clamping member pivotally coupled to the first clamping member, the second clamping member defining a third end and a fourth end, the second clamping member comprising:
        a base plate defining an aperture;
        a retention element laterally spaced apart from the base plate to define a space therebetween, wherein a stack of a plurality of sheets are disposed within the space; and
        a plunger slidable within the aperture of the base plate, wherein the plunger includes an upper member, a lower member, and an intermediate member extending between the upper member and the lower member; and
    a biasing member connected to the first clamping member proximate the first end thereof and to the second clamping member proximate the third end thereof, wherein the biasing member is adapted to bias the base plate towards the lower member based on removal of at least one of the notes and the flags from the stack
    wherein the biasing member is adapted to bias the second end and the fourth end of the first and second clamping members, respectively, towards the support structure for coupling the dispensing structure with the support structure.

6. The dispensing structure of claim 5, wherein the upper member is adapted to contact the stack when the stack is disposed within the space.

7. The dispensing structure of claim 5, wherein the biasing member is a spring.

8. The dispensing structure of claim 5, wherein plurality of sheets is a plurality of flags.

9. The dispensing structure of claim 5, wherein the plurality of sheets is a plurality of notes.

10. The dispensing structure of claim 5, wherein the first clamping member defines a first gripping surface proximate the first end thereof and the second clamping member defines a second gripping surface proximate the third end thereof.

11. A dispensing assembly comprising:
    a dispensing structure adapted to be removably coupled with a support structure, the dispensing structure comprising:
        a first clamping member defining a first end and a second end, and the first clamping member is adapted to contact a second side of the support structure for coupling the dispensing structure with the support structure;
        a second clamping member pivotally coupled to the first clamping member, the second clamping member defining a third end and a fourth end, the second clamping member comprising:
            a base plate defining an aperture;
            a retention element laterally spaced apart from the base plate to define a space therebetween; and
            a plunger slidable within the aperture of the base plate, wherein the plunger is adapted to contact a first side of the support structure;
        a biasing member connected to the first clamping member proximate the first end thereof and to the second clamping member proximate the third end thereof, wherein the biasing member is adapted to bias the second end and the fourth end of the first and second clamping members, respectively, towards the support structure for coupling the dispensing structure with the support structure; and a stack of a plurality sheets removably adhered to each other, wherein the stack is disposed within the space defined between the retention element and the base plate.

12. The dispensing assembly of claim 11, wherein the retention element includes a first plate and a second plate longitudinally spaced apart from the first plate such that a slot is defined therebetween, and wherein at least one of the plurality of sheets of the stack is adapted to pass through the slot.

13. The dispensing assembly of claim 11, wherein the first clamping member defines a first gripping surface proximate the first end thereof and the second clamping member defines a second gripping surface proximate the third end thereof.

14. The dispensing assembly of claim 11, wherein the dispensing structure is adapted to be at least one of coupled and removed from the support structure based on a pressure applied at the first and second gripping surfaces.

15. A dispensing assembly comprising:
a dispensing structure adapted to be removably coupled with a support structure, the dispensing structure comprising:
a first clamping member defining a first end and a second end;
a second clamping member pivotally coupled to the first clamping member, the second clamping member defining a third end and a fourth end, the second clamping member comprising:
a base plate defining an aperture;
a retention element laterally spaced apart from the base plate to define a space therebetween; and
a plunger slidable within the aperture of the base plate, wherein the plunger includes an upper member, a lower member, and an intermediate member extending between the upper member and the lower member; and
a biasing member connected to the first clamping member proximate the first end thereof and to the second clamping member proximate the third end thereof, wherein the biasing member is adapted to bias the second end and the fourth end of the first and second clamping members, respectively, towards the support structure for coupling the dispensing structure with the support structure, wherein the biasing member is adapted to bias the base plate towards the lower member based on removal of at least one of the notes and the flags from the stack; and
a stack of a plurality sheets removably adhered to each other, wherein the stack is disposed within the space defined between the retention element and the base plate.

16. The dispensing assembly of claim 15, wherein the upper member is adapted to contact the stack when the stack is disposed within the space.

17. The dispensing assembly of claim 15, wherein the biasing member is a spring.

18. The dispensing assembly of claim 15, wherein plurality of sheets is a plurality of flags.

19. The dispensing assembly of claim 15, wherein the plurality of sheets is a plurality of notes.

20. The dispensing assembly of claim 15, wherein the first clamping member defines a first gripping surface proximate the first end thereof and the second clamping member defines a second gripping surface proximate the third end thereof.

\* \* \* \* \*